Oct. 25, 1955  W. B. KEELOR  2,721,633
SHEET METAL JOINT
Filed Jan. 15, 1953  2 Sheets-Sheet 1
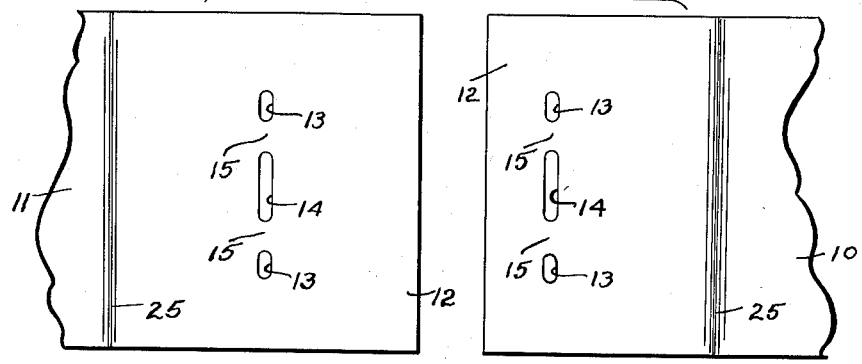
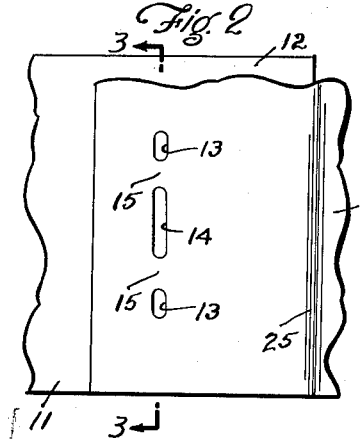
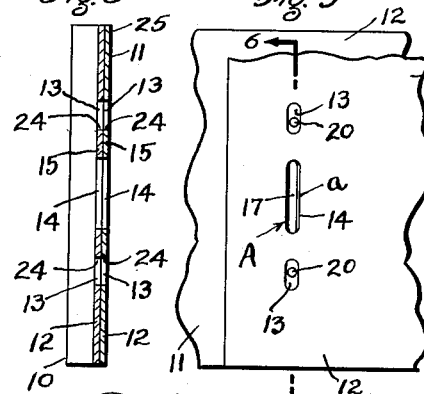
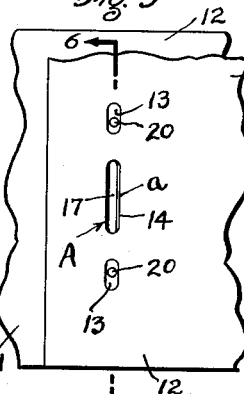
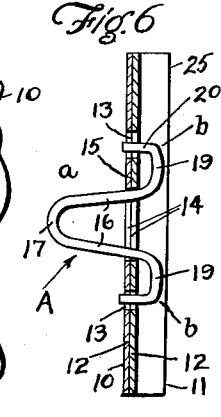
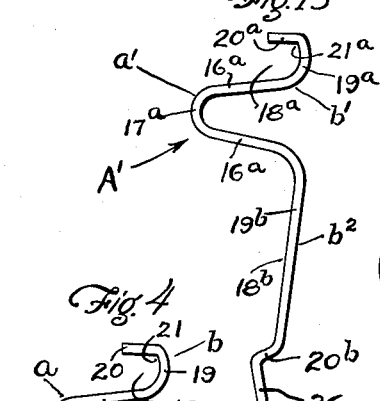
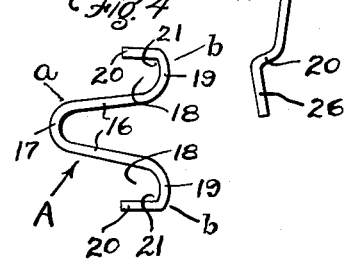
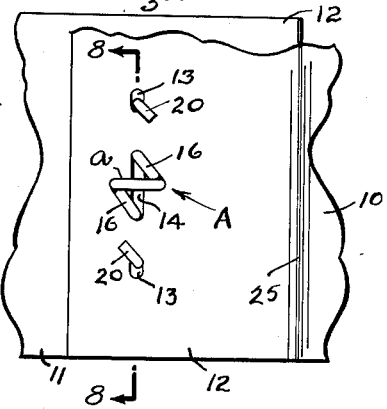
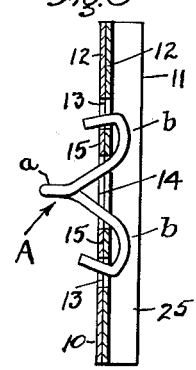
Inventor:
William B. Keelor
By: Carwell + Lagaard
Attorneys Oct. 25, 1955 W. B. KEELOR 2,721,633
SHEET METAL JOINT
Filed Jan. 15, 1953 2 Sheets-Sheet 2
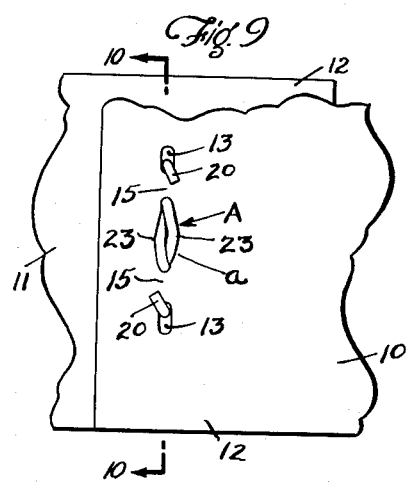
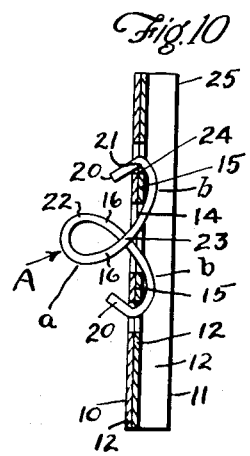
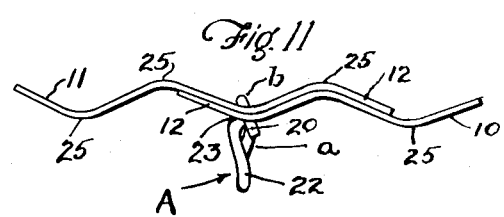
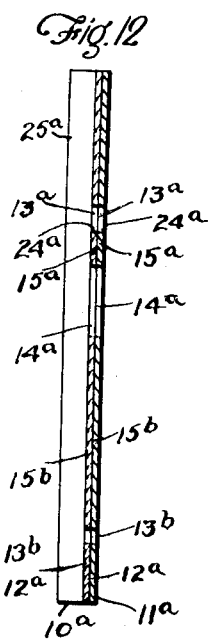
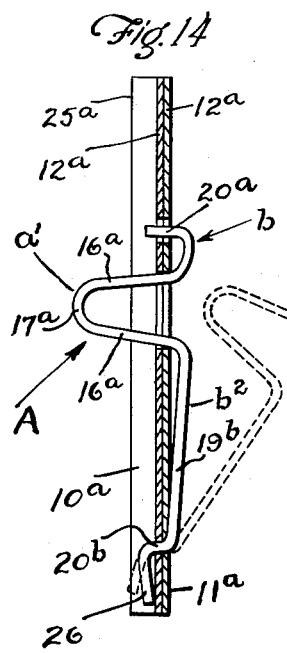
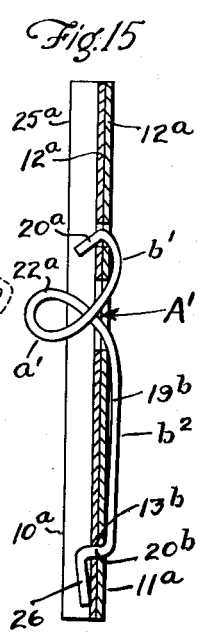
Inventor:
William B. Keelor
By: Canwell + Lagaard
Attorneys United States Patent Office 2,721,633
Patented Oct. 25, 1955

2,721,633

SHEET METAL JOINT

William B. Keelor, Plymouth Township,
Hennepin County, Minn.

Application January 15, 1953, Serial No. 331,449

7 Claims. (Cl. 189—36)

My invention relates to improvements in sheet metal joints of the nature wherein two sheets of metal are overlapped and the overlaps are joined by a fastener extending therethrough.

The present joint is particularly, though not exclusively, adaptable for use in the construction of lawn edging and terrace bolstering curbs, wherein strips of sheet metal, corrugated transversely thereof, are fastened together end to end and applied edgewise to the ground to form soil and root barriers of any length and contour desired.

An object of the invention is to provide a joint of the character aforesaid of simple, durable and inexpensive construction and which is capable of being quickly and easily completed for use with simple tools by the novice.

More specifically, it is an object of the invention to provide a joint of the present nature wherein the overlaps of overlapping sheets of metal are formed with registering apertures for the reception of a wire clip which, when applied to said apertures and subjected to a simple twisting of a portion thereof will tie said sheets together rigidly or for limited edgewise hinging movement to suit the prevailing conditions.

Other objects of the invention reside in the novel combination and arrangement of parts and in the details of construction hereinafter illustrated and/or described.

In the drawings:

Fig. 1 is an elevational view showing fragmentarily two sheets or strips of metal adapted to be lapped one on the other, the overlaps of said strips being formed with apertures therein according to the present invention.

Fig. 2 is a similar view showing the overlaps of said sheets juxtaposed.

Fig. 3 is a sectional view taken on the line 3—3 of Fig. 2.

Fig. 4 is an elevational view in detail of a tie-clip employed in one form of the invention, to fasten together the overlaps of sheets apertured as shown in Figs. 1, 2 and 3.

Fig. 5 is a view, similar to Fig. 2, showing said clip in its initial form and as initially applied to said apertured overlaps.

Fig. 6 is a sectional view taken on the line 6—6 of Fig. 5.

Fig. 7 is a view, similar to Fig. 5, showing the clip midway in the course of the twist of one-half turn which is imparted to the body thereof.

Fig. 8 is a sectional view taken on the line 8—8 of Fig. 7.

Fig. 9 is a view, similar to Fig. 7, showing the form finally given to said clip in completion of the joint between said sheets of metal.

Fig. 10 is a sectional view taken on the line 10—10 of Fig. 9.

Fig. 11 is a plan view of the structure shown in Fig. 9.

Fig. 12 is a sectional view, similar to Fig. 3, showing two sheets apertured, as in a second form of the invention.

Fig. 13 is an elevational detail view, similar to Fig. 4, showing in its initial form the clip which is employed in said second form of the invention.

Fig. 14 is a sectional view, similar to Fig. 6, the same illustrating the manner in which the clip shown in Fig. 13 is initially applied to the two sheets apertured as shown in Fig. 12.

Fig. 15 is a sectional view in development of the showing seen in Fig. 14, the same illustrating the clip of the second form of my invention as set in its ultimate form in completion of the sheet metal joint.

Reference being had to the drawings, developed views of one form of joint, in embodiment of my invention, will be seen in Figs. 1 to 11, inclusive. Fig. 1 shows fragmentarily a first sheet or strip 10 of sheet metal and a second similar sheet or strip 11 which two sheets are marginally overlapped as shown in Fig. 2, the overlap of each sheet being designated by the reference numeral 12. Punched in the overlap 12 of each of the sheets 10, 11 is a series of three elongated apertures formed in line, there being two relatively short end apertures 13 and a relatively long intermediate aperture 14. The series of apertures in the overlap 12 of the one sheet duplicates the series of apertures in the overlap 12 of the other sheet and, likewise, duplicated are the webs 15 of the overlaps 12 which intervene between the end apertures 13 and the intermediate apertures 14. Said end apertures 13, intermediate apertures 14, and webs 15 of the respective overlaps 12 register with each other, respectively, upon the juxtapositioning of said overlaps, as clearly seen in Figs. 2 and 3.

A tie clip A, made of round wire in the initial form shown in detail in Fig. 4, is inserted into the registering end and intermediate apertures 13, 14 of the overlaps 12, as shown in Figs. 5 and 6. In said form, the clip A includes a U-shaped body $a$ having legs 16 and a cross-tie 17. It also includes two hooks $b$, one in continuation of each leg 16, each hook $b$ being outwardly turned from its respective leg 16 in the plane of the body $a$ of the clip. Each hook $b$ has at the bight 18 thereof a curved bottom reach 19 and a straight return reach 20. At the junction of said bottom and return reaches 19, 20 of each hook $b$ is a reentrant angle 21 within the bight 18 thereof.

With the clip A in its said initial form, applied to the registering apertures of the overlaps 12 (Figs. 5, 6), the leg 16 of the body $a$ of said clip are received in the registering intermediate apertures 14, the closed end of said body $a$ projecting from the overlap 12 of said first sheet 10 at the outer side thereof. The return reaches 20 of the hooks $b$ are received in their respective registering end apertures 13, the bottom reaches 19 of said hooks $b$ overlying their respective webs 15 of the overlap 12 of the second sheet 11 at its outer side.

When the clip A has been applied to the juxtaposed overlaps 12 in its initial form, as above indicated, a twist of one-half turn is imparted to the body $a$ of the clip by means of a simple tool, such as a pair of pliers applied to the closed end of said body $a$, or such as a screw driver or other rod-like instrumentality inserted between the legs 16 of said body $a$ and applied thereto as a twisting lever. Figs. 7 and 8 show the clip A midway in the forming of the twist in its body $a$, while Figs. 9 to 11 show the clip A with the twist in its body $a$ completed. In Fig. 9, it is clearly seen that the clip A, set by the twist therein, has its legs 16 crossed, the cross-tie 17 of the body $a$ and the adjoining portions of the legs 16 forming an eye 22. At the intersection of the legs 16, said legs are distorted forming a cam-like hump 23 in each thereof, one in opposition to the other, each such hump bearing in cam-like fashion against the outer surface of the overlap 12 of the first sheet 10 at its respective side of the intermediate aperture 14 in said overlap. The hooks *b* are caught about their respective registering webs 15 of both sheets 10, 11, under tension created in the twisting of the body *a* of the clip. Each hook *b* has a self-assumed position, in relation to its respective registering webs 15 of the overlaps 12, in which position the reentrant angle 21 at the bight of the hook straddles the mating distal edges 24 of said webs 15 (Fig. 10). The return reach 20 of each hook *b*, in such assumed position thereof, overreaches its respective web 15 in the overlap 12 of the first sheet 10 at the outer side of said overlap and is canted to one side and oppositely in respect to the canting of the return reach 20 of the other hook.

The freedom by which the hooks *b* assume their ultimate positions aforesaid is due to the fact that the end apertures 13 are slightly wider than the thickness of the wire of the clip A and to the fact that said apertures 13 are elongated appreciably longer than the thickness of said wire. This feature also facilitates the insertion of the hooks *b* into the apertures 13, the comparative oversize of which affords some tolerance in accommodation of imperfections in the forming of the clips A in their initial form. The width of the intermediate apertures 14 is the same as the width of the end apertures 13, and while this dimension is greater than the thickness of the wire in clip A, it is appreciably less than twice the thickness of such wire. This is of course a requisite in order that the humps 23 at the crossing of the legs 16 will bear against the outer face of the overlap 12 of the first sheet 10.

From the foregoing, it will be understood that the overlaps 12 are gripped one against the other by the clip A, the body *a* and hooks *b* thereof oppositely reacting against said overlaps from the outer sides thereof. It will also be understood that said overlaps are further gripped one against the other by the hooks *b*, which, at the reentrant angles 21, straddle the mating distal edges 24 of their respective webs 15 in the overlaps 12. Furthermore, it will be readily comprehended that the hooks *b*, hooked about their respective registering webs 15 of the overlaps 12, serve to lock said overlaps against relative movement in their respective planes in the direction of the line of registering apertures 13, 14 in said overlaps. Any appreciable relative rectilinear movement of the overlaps 12 in other directions is precluded by those portions of the hooks *b* within the apertures 13, 14. However, a limited angular or hinging movement of the overlaps 12 about the axis of the body *a* of the clip A is possible, this feature being of advantage particularly in the joints between the strips of sheet metal in lawn edging, such feature enabling the edgewise hinging of adjacent sections of the edging to conform generally with undulations in the contour of the terrain at the site of application of the edging.

The sheets 10, 11 are preferably corrugated, at least as to the overlaps 12 thereof, the corrugations designated 25, running in the direction of the lines of the apertures 13, 14 therein. The corrugations 25 of one overlap 12 nest in or intermesh with the corrugations 25 of the other overlap. Due to this nesting or intermeshing of the corrugations, they resist relative edgewise rectilinear movement of the overlaps 12, except in the direction in which said corrugations run. Furthermore, due to this intermeshing of said corrugations, they resist edgewise hinging movements between the overlaps 12 which, in limited degree, is permitted about the axis of the body *a* of the clip A, thereby lending to the joint appreciable stability damping such hinging movement.

A second embodiment of my invention is illustrated in Figs. 12 to 15, inclusive. In designation of parts shown in said Figs. 12 to 15, inclusive, which correspond with similar parts of the first described form of my invention, shown in Figs. 1 to 11, inclusive, I have used similar reference characters accompanied with suffixes. The departure in said second form of joint, over said first form, resides particularly in the feature wherein the one of the hooks $b^2$ is relatively widespread and supplied with a terminal reach 26 in extension of the return reach $b^2$, said terminal reach 26 continuing substantially in the same direction as the bottom reach $19^b$ of the hook, but biased slightly downward. Said hook $b^2$ being of relatively wide span, the bottom reach $19^b$ is relatively long. Correspondingly, the end apertures $13^b$ in the overlaps $12^a$ are relatively widely spaced from the intermediate apertures $14^a$ therein to accommodate the return reach $20^b$ of said hook. In applying the hook $b^2$ to the juxtaposed overlaps $12^a$, the terminal reach 26 is first threaded through the registering end apertures $13^b$. Thereafter, the return reach $20^b$ is threaded into said apertures $13^b$ (dotted lines Fig. 14), the clip $A^1$ being then sprung home to insert the body $a^1$ into the registering intermediate apertures $14^a$ and also to insert the return reach $20^a$ of the other hook $b^1$ into the registering end apertures $13^a$. A one-half twist given to the body $a^1$ of the clip $A^1$, as hereinbefore described, completes the joint between the overlaps $12^a$ of the two sheets. In thus setting the clip $A^1$, the long bottom reach $19^b$ of the hook $b^2$ acts as the power arm of a lever. The return reach $20^b$, in the registering apertures $13^b$, acts as a fulcrum element, and the terminal reach 26 acts as a work arm, the end whereof engages the outer face of the overlap $12^a$ of the first sheet $10^a$ and presses said overlap against the overlap $12^a$ of the second sheet $11^a$ which bears against and is backed up in opposition to such pressure by the bottom reach $19^b$ of the hook $b^2$. This feature results in a gripping together of the overlaps $12^a$ of the sheets $10^a$, $11^a$ at a locality relatively remote from the body $a^1$ of the clip $A^1$. It is here to be further noted that the transverse cross-sectional dimensions of the registering end apertures $13^b$ in the overlaps $12^a$ only slightly exceed the corresponding dimensions of the return reach $20^b$ of the hook $19^b$ which reach is received in said apertures. This feature practically deprives the overlaps $12^a$ of any edgewise angular or hinging movement about the axis of the body $a^1$ of the clip $A^1$. Said two features, last mentioned, are particularly useful in adapting said second described form of my invention to a barrier or curbing made up of strips of sheet metal joined together end to end. In such construction the barrier or curbing structure stands on edge on relatively level footing so that it is desirable to have joints between sections of the structure tending to prevent relative endwise hinging of the sections rather than even yieldingly admitting of such hinging action in limited degree.

Barrier or curbing structures of the character mentioned are desirably outwardly bowed for purposes of esthetic appeal and for the stability of the installation, and when they are made up of strips of sheet metal, corrugated transversely thereof for appearance and for strength vertically thereof, they may also be readily outwardly bowed in conformity with any selected pattern of terracing. However, due to such corrugations, a bowed barrier or curbing element would be susceptible to endwise expansion under pressure from within to the impairment of the installation. Accordingly, it is desirable that such a barrier or curbing element be reinforced against endwise expansion, as by a reinforcing wire encompassing the convex side of a barrier element. Either of the herein disclosed forms of joints employed in such a barrier element would lend itself to the convenient use of such a reinforcing wire, which could be held in place by the eyes 22, $22^a$ of clips A, $A^1$, one of which would be located at each joint in the barrier element. In the case of the second form of clip $A^2$, the eye $22^a$ is situated in a valley between crests of adjacent corrugations $25^a$ and a portion of the opening in said eye lies flush with such crests. Thus, it will be seen that a wire threaded through such eyes $22^a$ would consistently engage the crests of the corrugations of the bowed barrier structure.

Changes in the specific form of the invention, as herein described, may be made within the scope of what is claimed without departing from the spirit of the invention.

Having described the invention, what is claimed as new and desired to be protected by Letters Patent is:

1. In a joint of the character described, first and second sheets of metal, a portion of each sheet overlapping a portion of the other sheet, the overlap of each sheet having in line therein two end apertures and an elongated intermediate aperture, said apertures defining webs therebetween, the corresponding apertures and webs in the two overlaps being similar and respectively in register with each other, a tie clip for said overlaps of said sheets, said clip consisting of a length of wire in initial form including a U-shaped body having two legs and a cross-tie therebetween closing the body at one end thereof, said body having in continuation of each leg an outwardly turned hook coplanar with said body, the legs of said body being received in the registering intermediate apertures in said sheets, one hook being received in one set of registering end apertures and the other hook being received in the other set of registering end apertures, the closed end of the body of the clip projecting from the first sheet at the outer side thereof, said hooks embracing their respective webs of the second sheet at its outer side and embracing also, in opposition to each other, the distal edges of their respective webs of both sheets, said body of said clip having an ultimate one-half turn twist therein, the legs thereof being crossed and oppositely distorted at their intersection forming opposed cam-like humps bearing against the outer face of the first sheet at opposite sides of the intermediate aperture therein, said body and hooks of said clip coacting with the overlaps of said sheets holding them together face to face and also holding them against relative rectilinear movement in their own planes.

2. The combination according to claim 1, wherein the end apertures in the overlaps of the sheets are of greater width than the thickness of the wire forming the clip, thereby allowing limited relative swivelling movement of the sheets in their own planes about the axis of the body of said clip.

3. The combination according to claim 1, wherein at least one of the hooks at the bight thereof has a bottom reach and a return reach forming a reentrant angle between them, said return reach inwardly overreaching its respective web of the first sheet and said reentrant angle straddling and receiving therein the distal edges of its respective webs in both sheets.

4. The combination according to claim 1, wherein the outer end portion of the body of the clip provides an element in the form of an eye, said element being rigidly incorporated in the joint structure.

5. The combination according to claim 1, wherein the two sheets, at least in respect to the overlaps thereof, are corrugated, the corrugations in said overlaps running in the direction of the line of apertures therein, the corrugations in one overlap nesting in the corrugations of the other overlap.

6. The combination according to claim 1, wherein the two sheets, at least in respect to the overlaps, are corrugated, the corrugations in said overlaps running in the direction of the line of apertures therein, the corrugations in one overlap nesting in the corrugations of the other overlap, and, wherein the closed end of the body of the clip provides an element in the form of an eye rigidly incorporated in the joint structure, said end of said body occupying a position in the valley of nesting corrugations, a portion of the opening in said eye being flush with the crests of the corrugations at opposite sides of said valley.

7. The combination according to claim 1, wherein at least one of the hooks is of relatively great span having a relatively long bottom reach, the corresponding end apertures in the sheets for said hook being relatively widely spaced from the intermediate apertures therein, said hook having a terminal reach extending in continuation of its return reach and forceably bearing at its extremity against the overlap of the first sheet at the outer side thereof, the bottom reach of said hook backing the overlap of the second sheet at its outer side against pressure imparted thereto from said terminal reach through said overlap of said first sheet.

References Cited in the file of this patent

UNITED STATES PATENTS

| | | |
|---|---|---|
| 283,651 | Palmer | Aug. 21, 1883 |
| 1,624,187 | Schlafly | Apr. 12, 1927 |
| 1,805,797 | Bates | May 19, 1931 |
| 1,843,108 | Claydon | Feb. 2, 1932 |